July 22, 1958 A. HEMEL 2,844,654
SINGLE-RELAY LINE CIRCUIT
Filed May 23, 1955
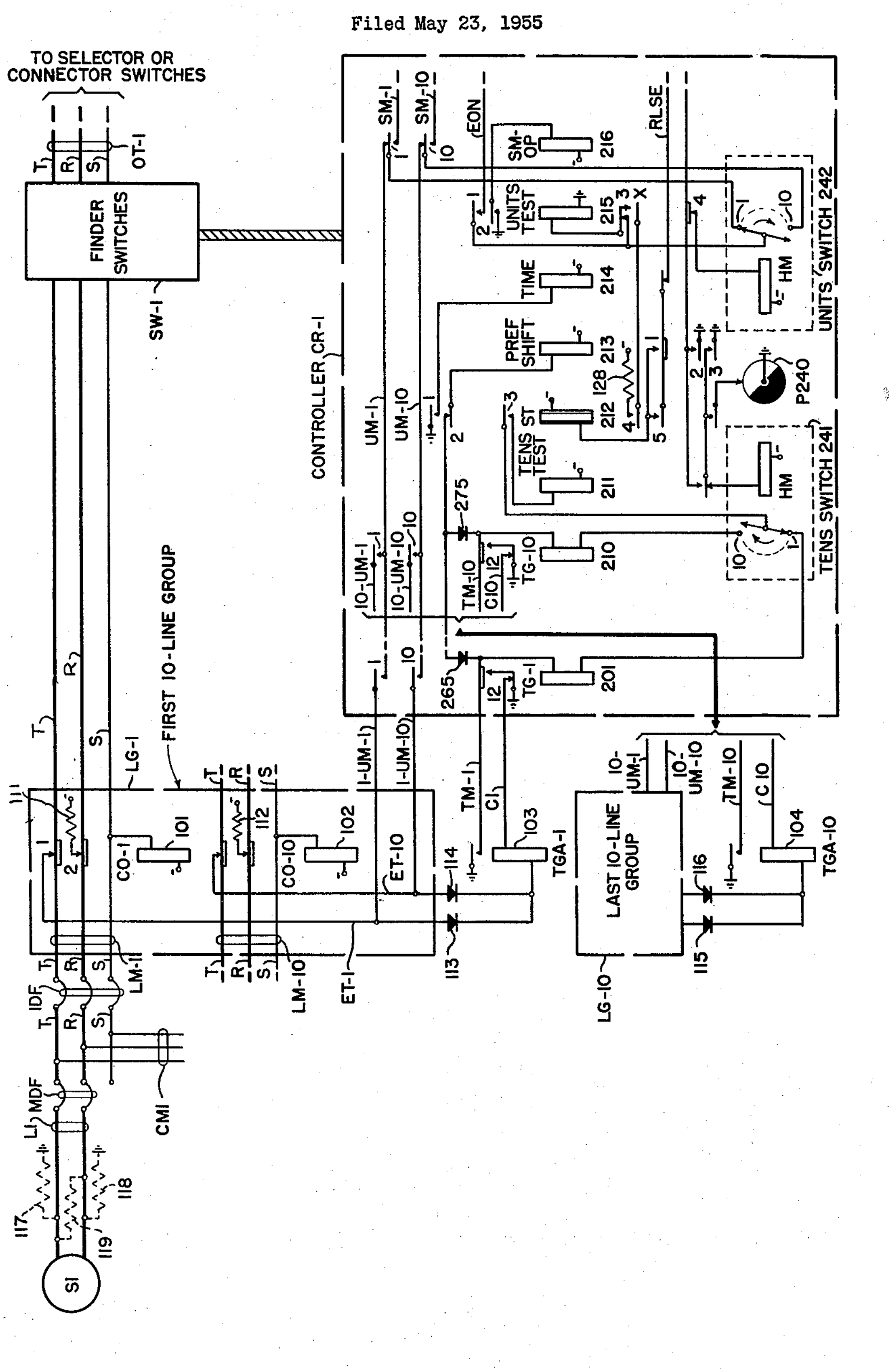

United States Patent Office 2,844,654

Patented July 22, 1958

2,844,654

SINGLE-RELAY LINE CIRCUIT

Albert Hemel, Skokie, Ill., assignor to International Telephone and Telegraph Corporation, New York, N. Y., a corporation of Maryland Application May 23, 1955, Serial No. 510,427

11 Claims. (Cl. 179—18)

This invention relates to a single-relay line circuit particularly for the two-wire lines used in switching systems. Its principal object is to provide a satisfactory and reliable line circuit wherein a single individual relay is employed while retaining the general operational features ordinarily requiring both a line relay and a cutoff relay for each line.

In carrying out the stated principal object, each two-wire line is provided only with an individual cutoff relay, and a relatively small number of line relays are provided, each common to all of the lines of a group. In prior attempts of this nature, any common line relay has been subject to false operation by cumulative line leakage, particularly leakage to ground, if placed between the ungrounded pole of the exchange battery and the associated lines; and it has been subject to operational failures, by being effectively shunted out of circuit by a heavy leakage to ground on any associated line, if placed in series with the grounded pole of the exchange battery.

According to the invention, any common line relay is placed between the ground-return wires of the associated lines and the grounded pole of the exchange battery to avoid false operations responsive to line leakage to ground, and the ground-return wires of the associated lines are effectively isolated from each other by respective impedance devices individually connected serially therein, whereby the common line relay is still operable, over any other associated line, in spite of a false ground connection to the ground-return wire on any associated line. Preferably, any such isolating impedance device either comprises or includes a rectifier element so poled as to prevent the potential-drop developed across the common line relay by a calling condition on one line from being dissipated by a leak current to ground over the ground-return conductor of any other associated line.

Further, according to the invention, a local arrangement is provided for temporarily restoring any operated common line relay after responsive line-extension action has occurred to insure that it does not give a false calling indication by being held operated by cross-line leakage currents below operate value.

It has been chosen to illustrate the invention as applied to a line-finder controller such as disclosed in the U. S. patent application of E. J. Leonard for a Crossbar-Switch Line-Finder System, Serial No. 468,443, filed November 12, 1954. In such application, the controller responds to a ground-potential tens and units mark from the calling group of ten lines to operate switching apparatus to connect the calling line to an idle called line or trunk. The line circuits of the invention are arranged to provide a ground-potential tens mark and a battery-potential units mark, requiring slight modification in the controller of the noted Leonard application, its operation however being substantially the same.

The above-mentioned and other features and objects of this invention and the manner of attaining them will become more apparent and the invention itself will be best understood, by reference to the following description of an embodiment of the invention taken in conjunction with the accompanying drawing wherein a group of line equipments and associated common tens relay is shown, together with a portion of the line finder controller of the noted Leonard application.

For convenience in description, the present system is assumed to have 100 telephone lines, although it will be understood that the invention is not so limited but may include systems employing many hundreds of lines. With these 100 lines of which only one line L1 is shown, there are provided ten common tens relays designated TGA–1 to TGA–10 inclusive. In addition, there is employed a cutoff relay, such as relay 101 and an associated rectifier element, such as 113 for each of the 100 lines.

As shown in the drawing, tens relay TGA–1 is associated with the ten lines in the first ten-line group over tip-extension conductors ET–1 to ET–10 and rectifiers 113 and 114, and is further associated with controller CR–1 over tens marking conductor TM–1 and control conductor C1. The individual lines in the first ten-line group are associated with such controller over respective mark wires 1–UM–1 to 1–UM–10. As will be described hereinafter, controller CR–1 responds to the marking on the tens mark wire TM–1 and on the units mark wires 1–UM-10 to control the finder switch SW1 to extend a connection from a line, such as line L1, to an idle trunk OT1 extending to the connector or selector switches.

Referring now to line L1, it will be observed that the subscriber station S1 is associated with its individual line multiple LM–1 through the usual main distributing frame jumper and intermediate distributing frame jumper. It will also be observed that a resistance 119 is shown bridged across the tip and ring conductors of line L1, such resistor assumed to be on the order of 10,000 ohms and being indicative of the line leakage between the line conductors of line L1. Resistances 117 and 118, being in the order of 10,000 ohms, are shown connected to respective conductors T and R and are indicative of the line leakage which may exist between either conductor to ground.

The finder switches, indicated as SW1, are assumed to be similar to the finder switches of the noted Leonard application and respond to control from controller CR–1 to extend a connection from the calling line to an originating trunk.

A detailed description of the invention will be now given by describing the operations involved in extending a calling line, such as line L1, to an idle originating trunk OT1 through line-finding operation.

Responsive to the subscriber at station S1 on line L1 removing the receiver (not shown), the usual line loop is closed across the tip and ring conductors T and R, closing an operate circuit for the associated tens relay 103. This circuit includes negative battery through current-limiting resistor 111, break contacts 2 of relay 101, the MDF and IDF jumpers, the line conductors and station S1 subset, break contacts 1 of cutoff relay 101, extension wire ET–1, rectifier 113, the winding of the commons relay TGA, wire C1, and ground through break contacts 12 of tens group relay 201 of controller CR–1.

Tens relay TGA–1 operates and at its make contacts grounds the tens mark wire TM–1, indicating that a call is waiting in the first ten-line group.

Calls from other ten-line groups may simultaneously or overlappingly operate their associated tens group relay to ground their associated tens mark wire indicating calls from other groups.

At such time, the ground on the tens mark conductors is extended through the associated ones of the rectifiers 265 to 275 and through break contacts 2 of start relay 212 to the battery-connected winding of preference shift relay 213.

Preference-shift relay 213 operates and at its make contacts 1 to 3 advance switches 241 and 242 one step and close an operate circuit for start relay 212, in a manner described in the noted Leonard application.

Start relay 212 operates and locks independently of relay 213. At its make contacts 1, it operates time relay 214 to time the interval that the controller CR–1 may be held for use on one call; its break contacts 2 open the operate circuit of relay 213; its make contacts 4 extend battery potential through resistor 128 to prepare a locking-circuit for the units test relay 215; its make contacts 6 cause the tens switch 241 to advance across its associated contact bank; and its make contacts 3 connect the battery-connected winding of the tens-test relay 211 to the brush of tens switch 241 in preparation for hunting across the tens-mark conductors TM–1 to TM–10.

The grounds appearing on the tens mark conductors TM–1 to TM–10 are extended to one side of the winding of the tens group relays associated with the tens group containing the calling lines and the other side of the windings of such tens group relays is connected to respective positions on the bank of switch 241. The brush of tens switch 241, having battery potential from the winding of the tens-test relay 211 appearing thereon, advances under control of interrupter P240 across the switch bank, successively engaging the tens-mark wires.

Assuming the preference shift relay 213 to have advanced the brushes of switch 241 to position 1 and the tens mark wire TM–1 to be grounded, the battery potential appearing on the brush is extended through the winding of the tens group relay 201 to the ground appearing on the tens-mark conductor TM–1, operating the tens group relay 201 and tens-test relay 211 in series.

Responsive to the operation of the tens group relay 201, make contacts 1 to 10 extend the battery potentials from the current-limiting resistors of each calling line in the first ten-line group and through associated ones of the break contacts of unoperated relay 216 to the brushes of units switch 242, which responsive to the operation of relay 211 advances its brush across its contact bank under control of interrupter P240. At the same time, relay 201 is locked operated and restores group relay TGA–1 at its contacts 12.

Responsive to the engagement of the brush of units switch 242 with the switch bank contacts associated with the marked units wire UM–1, units test relay 215 operates from the noted battery potential appearing on wire UM–1 and locks through current-limiting resistor 128. The noted restoration of tens relay TGA–1 leaves the extension conductor ET–1 free from all unnecessary current-consuming sources, thereby increasing the potential appearing on such wire, enhancing the operation of the units test relay 215.

At such time, as described in the noted Leonard application, controller CR-1 functions to cause finder switch SW1 to extend calling line L1 to an idle trunk OT1 extending to the next switching stage. As is well known, ground is thereupon returned on the sleeve conductor S, operating the cutoff relay CO–1 associated with the calling line, such operation clearing the calling line of all line circuit attachments.

Controller CR–1 is cleared out and returned to normal use in preparation for another call, in the manner described in the Leonard application.

As is common in line circuits employing a commons tens relay such as relay TGA–1, the leakage resistances 119 of a number of lines are effectively in parallel, resulting in a substantially lower bridge resistance. This lower bridge resistance, while insufficient to operate the tens relay, often is sufficient to hold such relay operated or to substantially delay its release. This noted opening of the operate circuit of the tens relay at contacts 12 of relay 210 prevents such trouble condition from arising.

It is also common for the line leakage resistance from either conductor to ground to be of such value that current flow through the leakage resistance, indicated as resistor 117, operates the tens relay to initiate line-finding action. However, with the one side of the winding of the tens relay being connected to ground, such leakage resistance to ground or accidental ground appearing on the line conductors cannot operate the tens relay. The rectifiers, such as 113 and 114 isolate the lines from each other as regards ground appearances on any line, to the end that a line fault on any line from ground appearing thereon does not disable the remaining lines in the same group.

While I have described above the principles of my invention in connection with specific apparatus, it is to be clearly understood that this description is made only by way of example and not as a limitation to the scope of my invention.

I claim:

1. In a communication system, a switchboard, a group of lines extending thereto and terminating thereat, means for transmitting a direct-current potential of a given polarity with respect to ground over any line to the switchboard to signal a call over that line, a line relay connected in common between all lines and ground, means controlled by the line relay for giving a call signal responsive to current flow therethrough resulting from the said direct-current potential on any line, and a separate impedance element connected serially between the line relay and each line to permit operating current to flow therethrough and through the line relay in a circuit path between ground and the calling line, while at least reducing the reverse flow therethrough which would tend to place the potential of the calling line on each other line, whereby the accidental grounding of any line other than the calling line leaves the common line relay operable over the calling line.

2. In a communication system according to claim 1, means for testing the lines individually for the said direct-current potential to thereby ascertain which one is the calling line.

3. In a communication system according to claim 2, means for opening the path to ground through the line relay during the said testing operation to eliminate the drop in potential over the calling line occasioned by the line-relay current, whereby a large test potential is then available on the calling line.

4. A communication system according to claim 2, wherein the line relay is capable of being held operated by a lesser potential, and consequent line current, than is required to operate it, means for isolating the calling line from the line relay, and means for temporarily restoring the line relay irrespective of a calling condition on any unisolated line, thereby avoiding a false calling condition such as might otherwise obtain from foreign holding-value potentials on non-calling lines.

5. In a communication system according to claim 1, each of the said impedance elements serially including a rectifier element so poled as to readily permit passage of the said operating current therethrough from its associated line, while resisting the reverse flow therethrough to ground on the associated line when some other line of the said group is the calling line.

6. In a communication system according to claim 2, a separate test wire for each line, the test wire for any line comprising an extension of the line side of the said separate impedance element thereof, and means for connecting the said test means between ground and the test wires in succession, the said test means being such that current flows between ground and any connected calling line through the said test means in a circuit bypassing the said impedance element thereof.

7. In a communication system according to claim 4, the said means for isolating a calling line from the line relay including a cutoff relay individual to the calling line and including means for operating it responsive to the said test means ascertaining the calling line.

8. In a communication system according to claim 1, each of said lines having a first and a second conductor, and the said means for transmitting a direct-current potential to signal a call including means for varying the conductance between the said line conductors.

9. In a communication system according to claim 2, the said switchboard including switching apparatus common to the said lines for extending connections from calling lines towards called lines or trunks, and including control apparatus controllable by the said testing means for operating a portion of the switching apparatus to extend the said connection from the line ascertained by the testing means as the calling line.

10. In a communication system according to claim 9, individual sleeve conductors and individual cutoff relays for respective lines, means responsive to the said extension of a connection for energizing the sleeve conductor of the calling line to operate the associated cutoff relay, and means controlled by the said cutoff relay for isolating the calling line from the said line relay.

11. In a communication system according to claim 1, groups of said lines and respectively corresponding ones of said line relays, the said switchboard including switching apparatus common to the said lines for extending connections from calling lines towards called lines or trunks and including control apparatus common to the said groups of lines for operating the switching apparatus to extend the said connections, means responsive to the said call signal from any line relay for temporarily individualizing the control apparatus with such line relay and associated group of lines, test means in the said control apparatus for testing the lines in the last-said group for the said direct-current potential to select the calling line therein, and means controlled by the said test means for operating a portion of the switching apparatus to extend the said connection from the selected calling line.

References Cited in the file of this patent

UNITED STATES PATENTS

| | | |
|---|---|---|
| 2,152,889 | Jedrychowski | Apr. 4, 1939 |
| 2,193,427 | Marrison | Mar. 12, 1940 |
| 2,410,304 | Powell | Oct. 29, 1940 |